United States Patent
Subbotin

(10) Patent No.: US 7,804,525 B2
(45) Date of Patent: Sep. 28, 2010

(54) METHOD, APPARATUS, AND SYSTEM FOR SELECTING PIXELS FOR AUTOMATIC WHITE BALANCE PROCESSING

(75) Inventor: Igor Subbotin, South Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 1038 days.

(21) Appl. No.: 11/508,889

(22) Filed: Aug. 24, 2006

(65) Prior Publication Data

US 2008/0049274 A1    Feb. 28, 2008

(51) Int. Cl.
 *H04N 9/73* (2006.01)
 *H04N 5/20* (2006.01)
(52) U.S. Cl. .................... 348/223.1; 348/255
(58) Field of Classification Search ................ 348/244, 348/225.1, 228.1, 223.1, 254, 229.1, 224.1, 348/222.1, 251, 246; 382/163
See application file for complete search history.

(56) References Cited

U.S. PATENT DOCUMENTS

| | | | | |
|---|---|---|---|---|
| 6,023,264 A * | 2/2000 | Gentile et al. | ............... | 345/596 |
| 6,670,987 B1 * | 12/2003 | Taura | ..................... | 348/223.1 |
| 7,177,467 B2 * | 2/2007 | Tsai et al. | ................... | 382/167 |
| 7,453,500 B2 * | 11/2008 | Nakayama | ............... | 348/224.1 |
| 7,593,043 B2 * | 9/2009 | Uezono | ................... | 348/222.1 |
| 2004/0090536 A1 | 5/2004 | Tsai et al. | | |
| 2006/0092171 A1 | 5/2006 | Zhang | | |

* cited by examiner

Primary Examiner—David L Ometz
Assistant Examiner—Ahmed A Berhan
(74) Attorney, Agent, or Firm—Dickstein Shapiro LLP

(57) ABSTRACT

A method, apparatus, and system that use a white balance operation. A selecting process is applied to each pixel selected and considered for automatic white balance statistics to determine the distance from the selected pixel to a white curve defined in a white area corresponding to an image sensor.

8 Claims, 8 Drawing Sheets

METHOD, APPARATUS, AND SYSTEM FOR SELECTING PIXELS FOR AUTOMATIC WHITE BALANCE PROCESSING

FIELD OF THE INVENTION

Embodiments of the invention relate generally to selecting pixels for automatic white balance processing.

BACKGROUND OF THE INVENTION

One of the most challenging problems in color image processing is adjusting the color gains of a system to compensate for variations in illumination spectra incident on an image sensor. This process is typically known as white balance processing. The human eye and brain are capable of "white balancing." If a human observer takes a white card and exposes it to different kinds of illumination, it will look white even though the white card is reflecting different colors of the spectrum. If a person takes a white card outside, it looks white to the person's eye. If a person takes a white card inside and views it under fluorescent lights, it still looks white. When viewed under an incandescent light bulb, the card still looks white to the human eye. Moreover, even when placed under a yellow light bulb, within a few minutes, the card will look white. With each of these light sources, the white card is reflecting a different color spectrum, but the human brain is smart enough to know that the card looks white.

Obtaining the same result with a camera or other image-capturing device having an image sensor is much harder. When the white card moves from light source to light source, an image sensor "sees" different colors under the different lights. Consequently, when an image-capturing device, e.g., a digital camera, is moved from outdoors (sunlight) to indoor fluorescent or incandescent light conditions, the color in the image shifts. If the white card looks white when indoors, for example, it might look bluish outside. Alternatively, if the card looks white under fluorescent light, it might look yellowish under an incandescent lamp.

The white balance problem stems from the fact that spectral emission curves of common sources of illumination are significantly different from each other. For example, in accordance with Plank's law, the spectral energy curve of the sun is shifted towards the shorter wavelengths relative to the spectral energy curve of an incandescent light source. Therefore, the sun can be considered to be a "blue-rich" illuminator while an incandescent bulb can be considered to be a "red-rich" illuminator. As a result, if the image processing settings are not adjusted, scenes illuminated by sunlight produce "bluish" imagery, while scenes illuminated by an incandescent source appear "reddish".

After a digital camera (i.e., an image-capturing device) captures an image, the circuitry within the camera performs image processing to compensate for changes in illumination spectra. To compensate for changes in illumination spectra, the gains of the color channels of, e.g. R,G,B, of image processing systems and/or image sensors are adjusted. This adjustment is usually performed by the image processing systems to preserve the overall luminance (brightness) of the image. As a result of proper adjustment, gray/white areas of the image appear gray/white on the image-capturing device (hence the term "white balance").

In the absence of specific knowledge of the spectra of the illumination source, this adjustment can be performed based on automatic white balance (AWB) statistics. Automatic white balance statistics are based on a statistical analysis of the pixels in the image itself to obtain information about the luminance of colors in the image. The statistical analysis selects a sample of pixels in the image by applying one or more criteria. The values of the pixels that meet the criteria are then used to obtain the color balance statistical information. The image-capturing device can initiate a white balance operation and perform color correction on the image based on the automatic white balance statistics. That is, the collected statistics are compared to expected values and the results of the comparison are used to correct the white balance in the image.

For obtaining automatic white balance statistics, pixels must be selected. One approach to selecting pixels is a white point estimation method. White point estimation can be determined by applying a known gray world model. The gray world model is premised on having the entire image balancing out to gray, i.e., the average color of the image balances out to gray, where gray comprises equivalent amounts of red, green, and blue components. In applying the gray world model for white point estimation, the white point chromaticity corresponds to the average image chromaticity. Since gray is a neutral tone, any variations from the neutral tone in the illumination spectra would be adjusted accordingly.

Several selecting criteria for the selecting pixels are used to obtain automatic white balance statistics. For white point estimation, one selecting criterion requires that only pixels within a white area of the image are selected for the automatic white balance statistics. One method of applying the selecting criterion includes determining a white area of the image sensor, which can be specified during manufacturing by calibrating white curves within the white area. One approach to calibrate a white curve is to take pictures of GretagMacBeth Color Rendition Chart (or similar chart) at different light sources (i.e., different color temperatures) and plot coordinates for gray patches (i.e., applying the gray world model). Since it is known what the colors are supposed to look like (from the chart), raw color data is determined for the image sensor. By applying the gray world model, the coordinates for the gray patches identify a white area for the image sensor; accordingly, a white curve within the white area can be specified for the image sensor.

FIG. 1a illustrates a Log(B/G) vs. Log(R/G) diagram (where B, G, and R are the colors blue, green, and red, respectively) for each GretagMcBeth color square received for a specific image sensor. A series number corresponds to a GretagMcBeth color square number. B/G and R/G ratios are calculated for each row of pixel data received after applying unity analog and digital gain to each color channel at four different illumination source color temperatures ranging from 2800K to 6500K. Series 19-22 are received from the gray GretagMcBeth chart zones and define the white area of the image sensor. Series 1-18 are received from other colors, e.g., red, blue, and green, of the GretagMcBeth chart zones and define the other color chart zones.

FIG. 1b illustrates a white curve within the white area of an image sensor being defined by four nodes plotted in the two-dimension space, i.e., an x and y coordinate space. Each node is associated with coordinates, e.g., Log(B/G) vs. Log(R/G).

Additionally, a threshold distance, shown in FIG. 1b, is specified for the image sensor to determine the boundary of the white area for the image sensor. The threshold distance can be used to determine if a pixel selected from the image is within the white area of the image. The coordinates defining the white curve and the threshold distance are stored in storage areas. The coordinates and threshold distance can later be retrieved by image processing systems and used, for example, as part of the selecting criterion process for white point estimation.

A white curve can also be defined by other coordinates, such as, B/G vs. R/G; Log 2(B/G) vs. Log 2(R/B); Y vs. X; (R−B)/Y vs. (R+B−2G)/Y. Each pixel considered for automatic white balance statistics has to be tested to determine if it is within the white area of the image.

A method and system for selecting pixels for automatic white balancing that do not require a large amount of processing resources for selecting are desirable.

DETAILED DESCRIPTION OF THE INVENTION

In the following detailed description, reference is made to various specific embodiments in which the invention may be practiced. These embodiments are described with sufficient detail to enable those skilled in the art to practice them. It is to be understood that other embodiments may be employed, and that structural and logical changes may be made.

The term "pixel" refers to a picture element in an image. Digital data defining an image may, for example, include one or more color values for each pixel. For a color image, each pixel's values may include a value for each of a plurality of colors, such as red, green, and blue.

Figure 2:
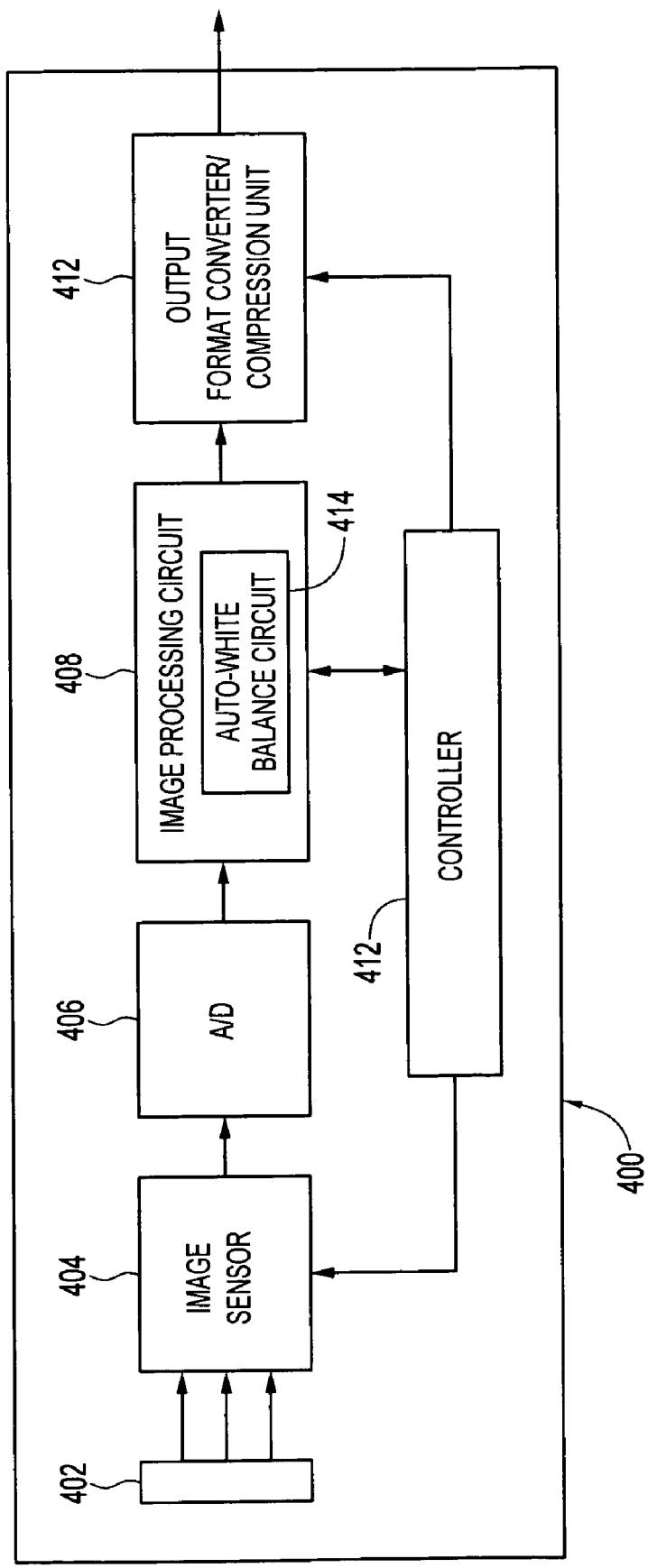
FIG. 2 is a schematic block diagram of an imaging apparatus that performs an automatic white balance operation in accordance with an embodiment of the invention.

FIG. 2 illustrates an embodiment of an imaging apparatus 400 of the invention that includes an image sensor 404 and an imaging processing circuit 408. The imaging apparatus may be used, for example, in a digital camera. The imaging processing circuit 408 further includes an auto-white balance circuit ("AWB") 414. The apparatus 400 also includes a lens 402 for directing light from an object to be imaged to the image sensor 404 having a pixel array that produces analog signals based on the viewed object. An analog-to-digital (A/D) converter 406 converts the analog pixel signals from the image sensor 404 into digital signals, which are processed by the image processing circuit 408 into digital image data. The output format converter/compression unit 410 converts the digital image data into an appropriate file format for output or display. The controller 412 controls the operations of the entire apparatus 400.

The image sensor 404 is a sensor that may be any type of solid state images including CMOS, CCD and others. The image sensor 404 receives image information in the form of photons, and converts that information to pixel analog electrical signals, which are subsequently provided to down stream processing circuits. In the imaging apparatus 400, the image sensor 404 provides electrical signals to the image processing circuit 408.

The image processing circuit 408 performs image processing on the digital signals received from analog-to-digital (A/D) converter 406. The image processing circuit can be implemented using logic circuits in hardware, or using a programmed processor, or by a combination of both. The image processing circuit 408 may include other circuits that perform pixel defect correction, demosaicing, image resizing, aperture correction, and correction for other effects or defects.

In an embodiment, the image processing circuit 408 outputs are pixels having RGB channels representational of the image data from red, blue and green pixels of image sensor 404. The image processing circuit 408 also converts the RGB image signals into a second set of data structures representing image pixel data in YUV format that are also representational of the RGB data. YUV stores image data in Y—luminance ("luma"), U—blue chrominance ("blue chroma" or "Cb") and V—red chrominance ("red chroma" or "Cr").

The auto-white balance circuit 414 receives image data, in the form of the YUV data structures and computes the correction values, if required, to perform white balancing. The auto-white balance circuit 414 provides the results of its computation to the image processing circuit 408. The white balance computation in the auto-white balance circuit 414 is performed using the YUV data structure because of the inherent properties of the YUV data structure. The YUV data structure breaks down an image into the Y, the luminance values, and UV, which is essentially a two-dimensional representation of color, where the two color components are U and V (i.e., Cb and Cr). Any color can be expressed in terms of the two color components, which can be plotted in an x and y coordinate space.

The image processing circuit 408 receives information from the auto-white balance circuit 414 and provides gain information to the component of the YUV data structure and thus makes appropriate adjustments to an image.

Figure 3:
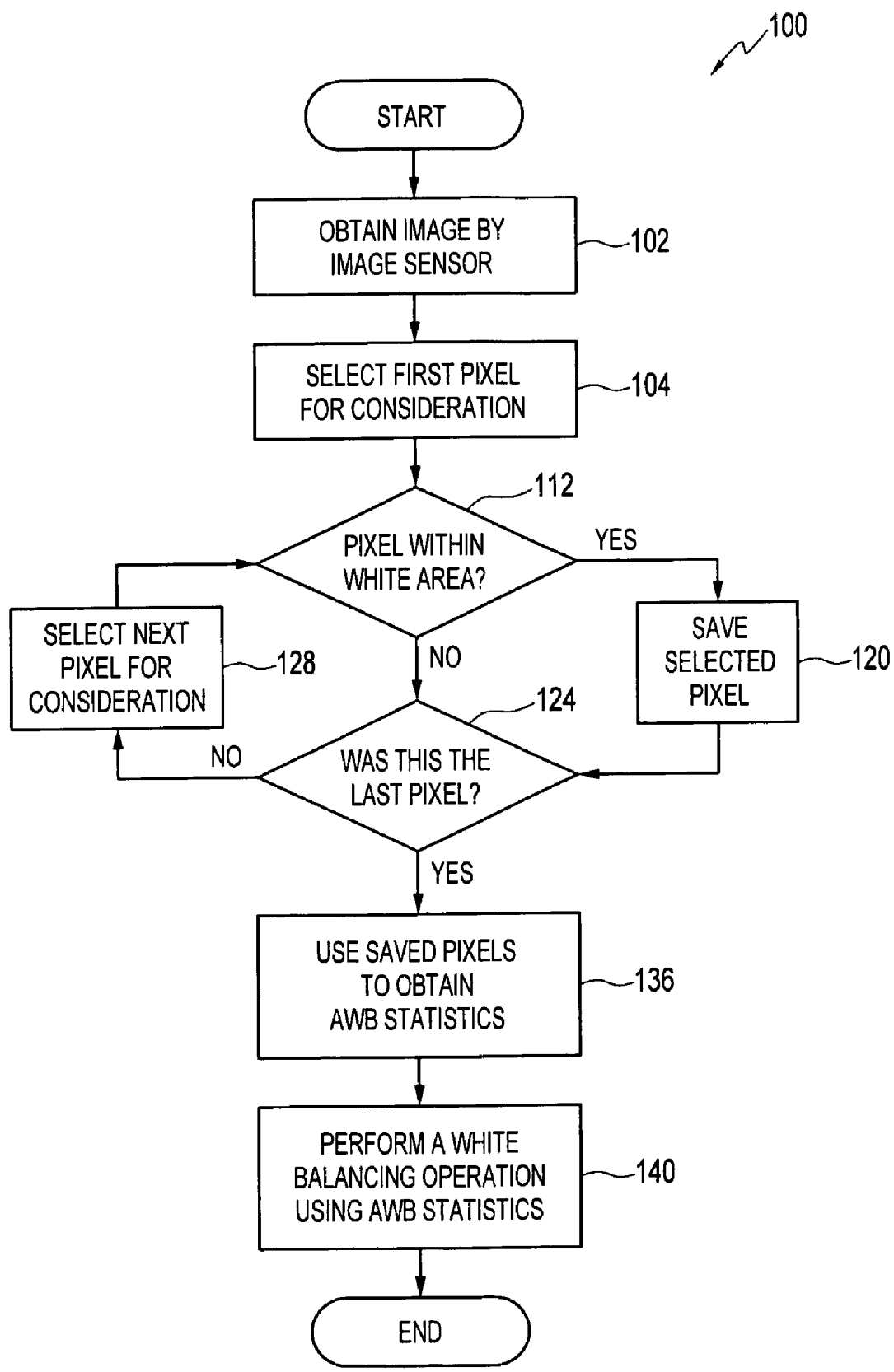
FIG. 3 is a flowchart of an image process method that includes an automatic white balance operation in accordance with an embodiment of the invention.

FIG. 3 is a flowchart illustrating an imaging process method 100 that includes a white balancing operation using a white point estimation in accordance with an embodiment described herein. As depicted in FIG. 3, after obtaining the image by the image sensor 404 (step 102), the auto-white balance circuit 408 performs a white balancing operation (steps 104-140). As part of the white balancing operation, a white point estimation (steps 112-128) is also executed by the auto-white balance circuit 408, in which one selecting criterion determines whether a selected pixel is within a white area of the image.

At step 104, a first pixel considered for automatic white balance statistics is selected from the captured image. Typically, the pixels considered for automatic white balance statistics are selected from the captured image in same order, row by row and pixel by pixel within a row. Next, at step 112, it is determined if the pixel is in the white area (described below in more detail). The acceptance of the pixel for automatic white balance statistics, depicted as a "Yes" response in Step 112, depends on the selecting criterion (described below in more detail) used at step 112.

At step 120, the data for a selected pixel that meets the selecting criterion is saved, and the method 100 continues at step 124. On the other hand, if the selected pixel does not meet the selecting criterion at step 112, then the method 100 continues at step 124 without saving the pixel data. At step 124, a determination is made to decide if the selected pixel is the last pixel to be tested. If it is determined that the pixel is not the last pixel, the method 100 continues at step 128. Otherwise, the method 100 continues at step 136.

Steps 112-128 are repeated until it is determined at step 124 that the last pixel from the captured image has been selected. Once it is determined at step 124 that a selected pixel is the last pixel considered for automatic white balance statistics; at step 136, saved pixel data is used to obtain the automatic white balance statistics. At step 140, the automatic white balance statistics are then used by the auto-white balance circuit 408 to perform a white balancing operation.

If it is determined at step 124 that the selected pixel is not the last pixel to be considered for automatic white balance statistics, then at step 128, the next pixel is selected, and the method 100 continues at step 112.

Figure 1A:
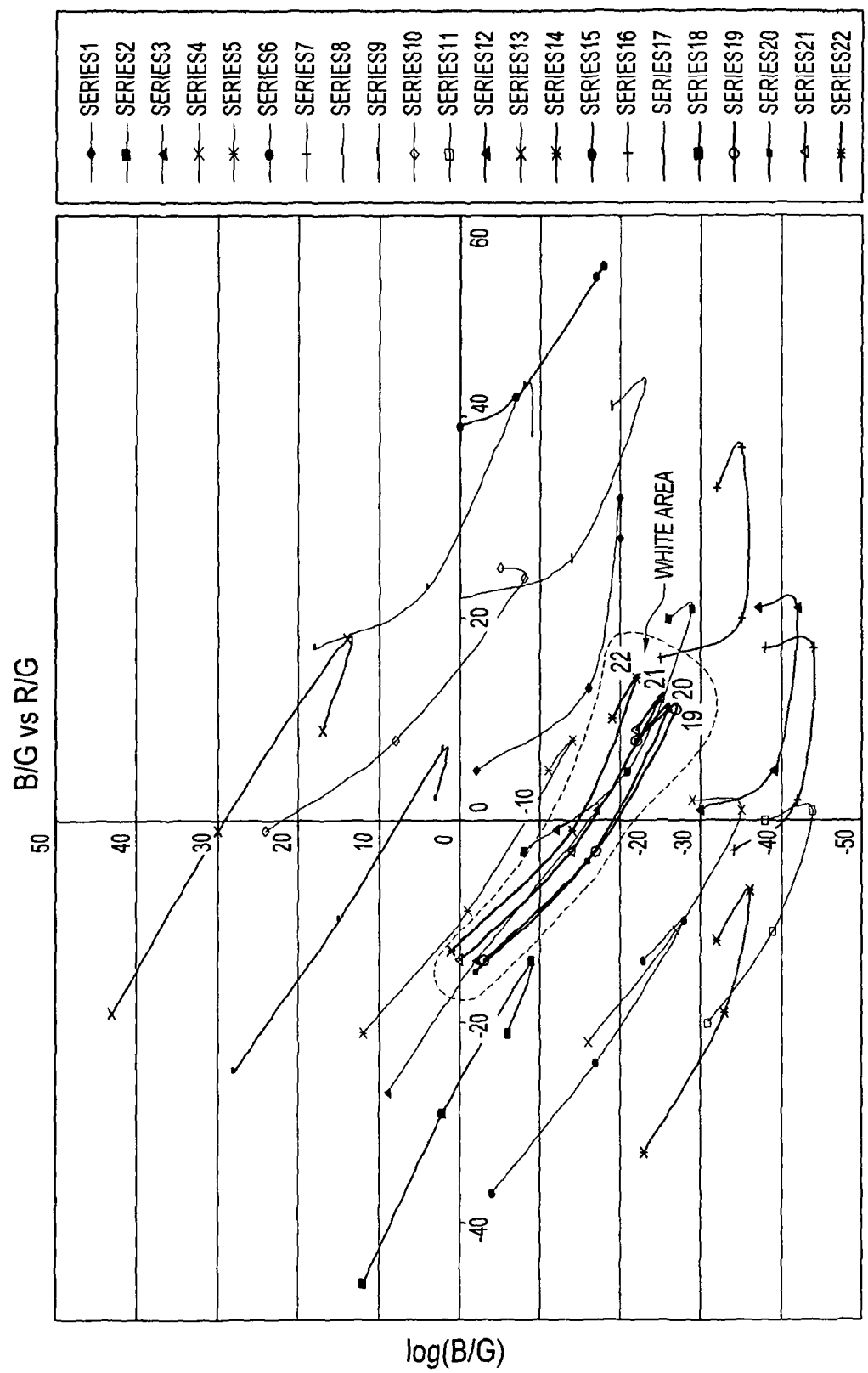
FIG. 1a is diagram of a white area for a specific image sensor plotted in a two-dimension space.
Figure 1B:
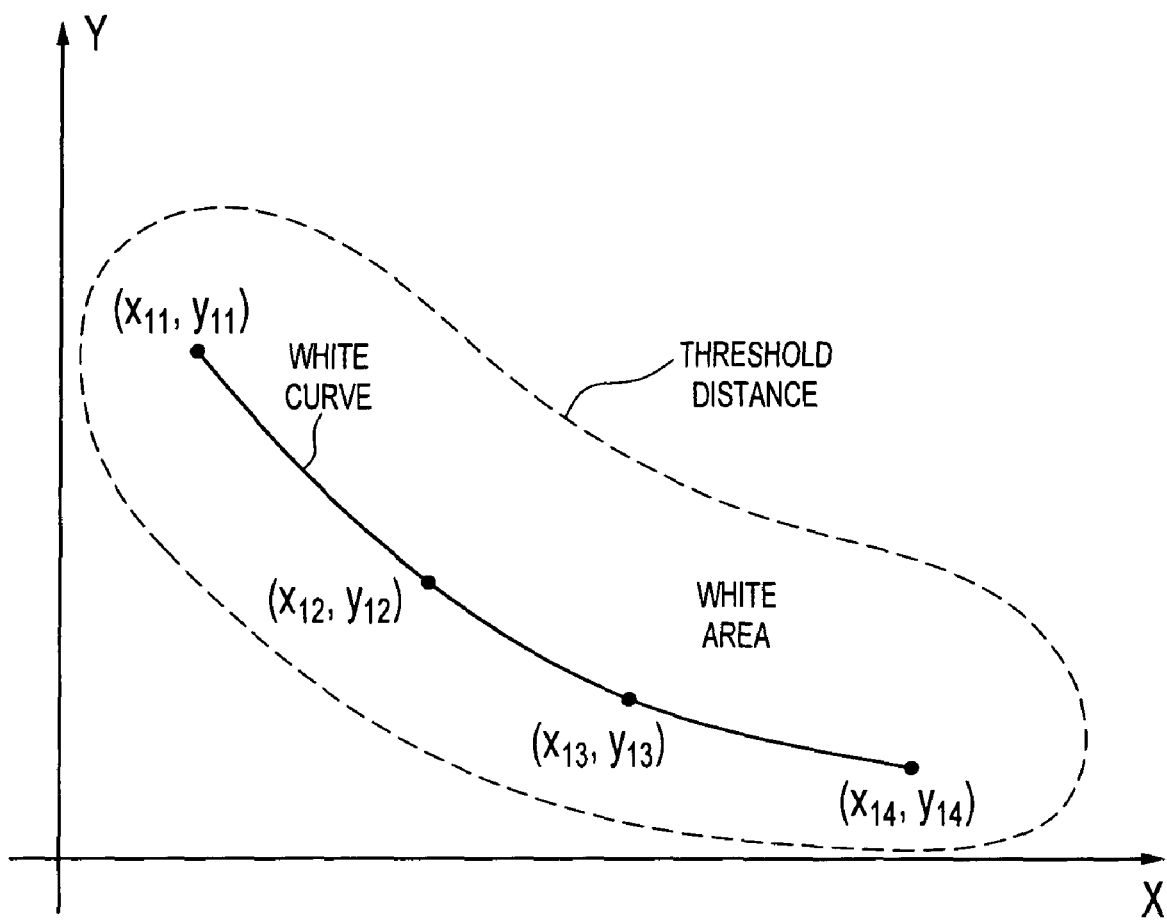
FIG. 1b is a graphical representation of a white curve, within the white area identified in FIG. 1, plotted in an (x, y) coordinate space.
Figure 4:
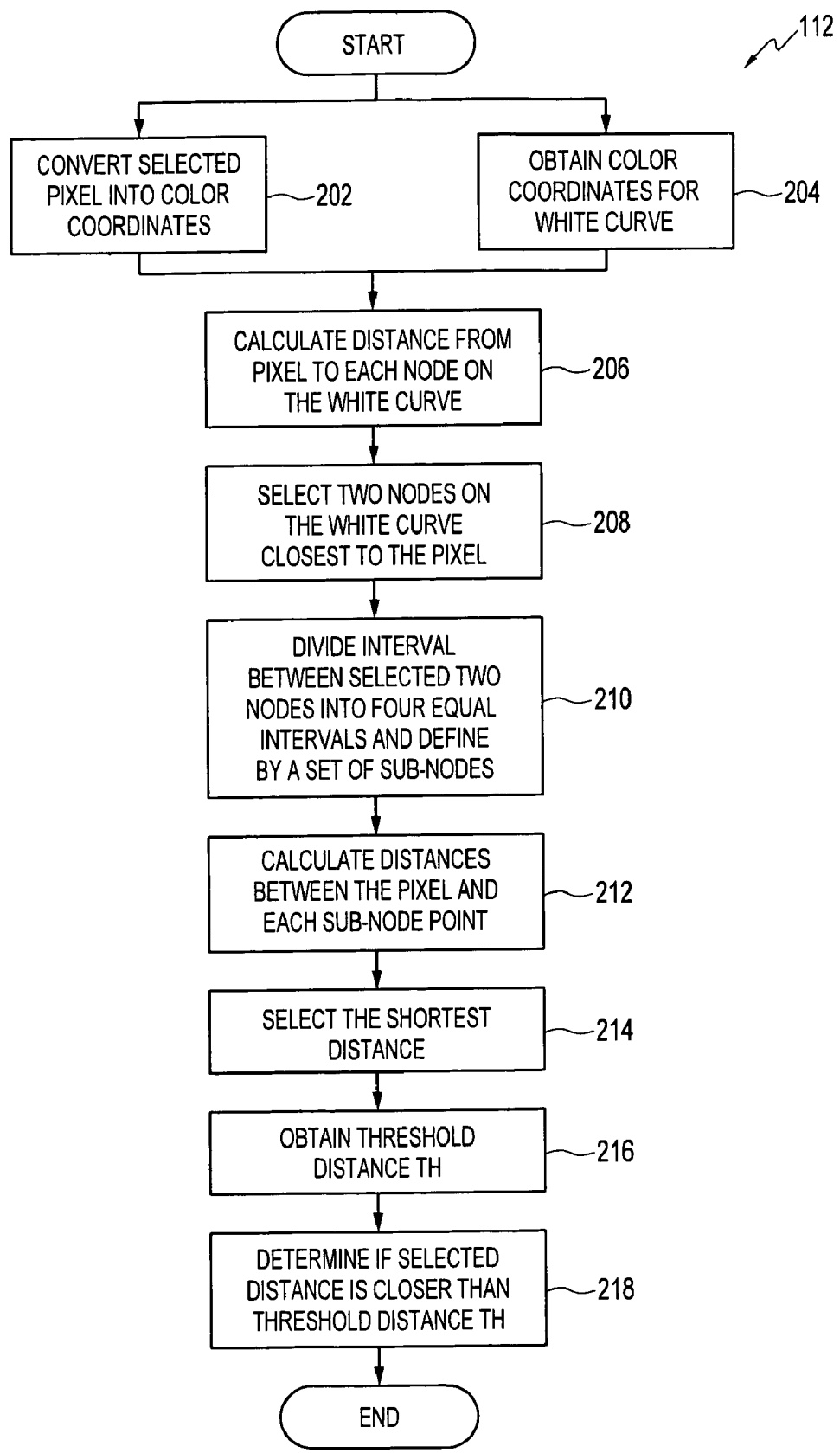
FIG. 4 is a flowchart of a selecting process in accordance with an embodiment of the invention.
Figure 5A:
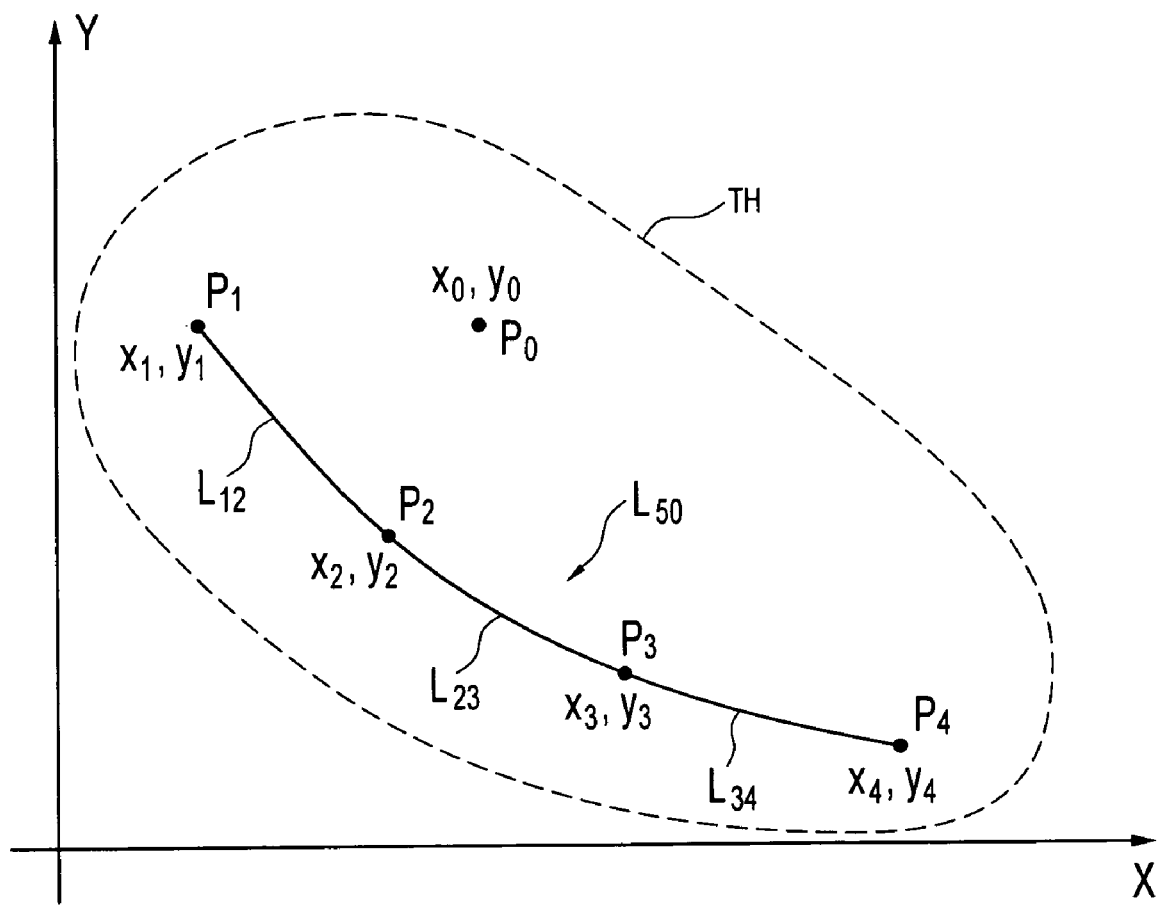
FIGS. 5a and 5b are graphical representations of an example of a white curve for a specific image sensor and a pixel considered for automatic white balance statistics in accordance with an embodiment of the invention.
Figure 5B:
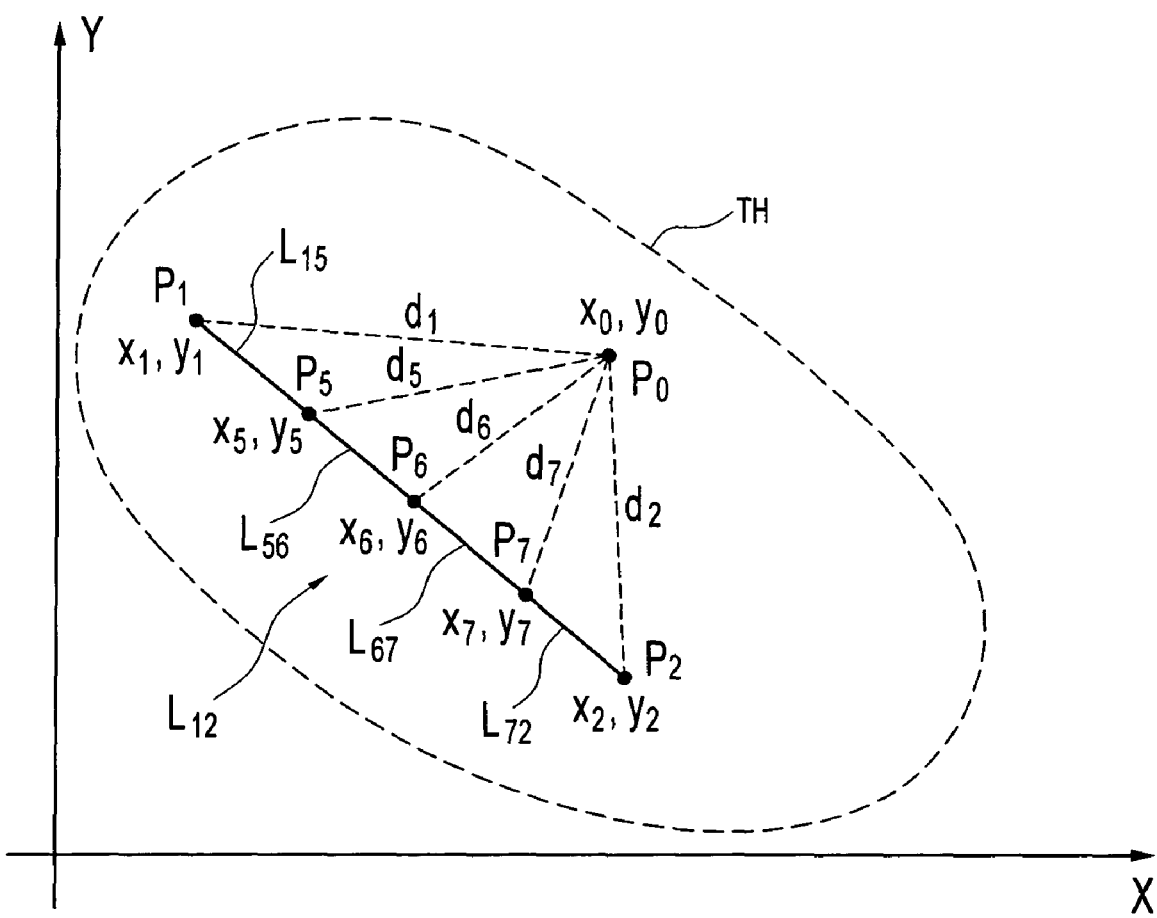

Determining if a pixel meets the selecting criterion used at step 112 includes estimating the distance from the selected pixel to a white curve, e.g., FIG. 1b, specified in the white area of the image sensor 404. FIGS. 4, 5a, and 5b illustrate an embodiment of the pixel selecting process used at step 112 (FIG. 3) that includes a relatively quick method of determining the shortest distance between the selected pixel and the white curve specified by piecewise linear curve.

Once the first pixel has been selected at step 102 of FIG. 3, the selected pixel is converted into the YUV data structure, as described above. The two color components are U and V are plotted in x and y coordinate space, at step 202 (FIG. 4). At step 204, the coordinates defining a white curve within a white area of the image sensor specified during manufacturing are obtained from storage. The coordinates defining the white curve are defined by a piecewise linear curve and plotted in (x, y) coordinate space. FIGS. 5a and 5b illustrate an example of the white curve, and the selected pixel plotted on a diagram in a (x, y) coordinate space.

FIG. 5a illustrates the white curve $L_{50}$ having a set of nodes $P_1$, $P_2$, $P_3$, $P_4$ with associated coordinates $(X_1,Y_1)$, $(X_2,Y_2)$, $(X_3,Y_3)$, $(X_4,Y_4)$. Interval $L_{12}$ is between nodes $P_1$ and $P_2$. Interval $L_{23}$ is between nodes $P_2$ and $P_3$. Interval $L_{34}$ is between nodes $P_3$ and $P_4$. The selected pixel being considered for white balance statistics is defined by node $P_0$ having associated coordinate $(X_0,Y_0)$.

Referring to FIGS. 5b and 4, at step 206, the distance between selected pixel node $P_0$, and each white curve nodes $P_1$, $P_2$, $P_3$, $P_4$ is calculated by applying the procedure DIST (A,B) as follows:

$Dis1=DIST(P_0,P_1)$;

$Dis2=DIST(P_0,P_2)$;

$Dis3=DIST(P_0,P_3)$; and $Dis4=DIST(P_0,P_4)$;

where DIST(A, B) estimates the distance between node A and B. If node A has coordinate [Xa,Ya] and node B has coordinate [Xb,Yb], the equation defining the distance between these two nodes is $DIST(A, B)=\sqrt{(Xa-Xb)^2+(Ya-Yb)^2}$. Implementation of this equation might be difficult and costly; alternatively, the following estimation can be easily implemented. The following estimation provides an acceptable, less than 10% error, in distance detection.

Applying the estimation to the illustrated example in FIG. 5a, we begin by calculating the distance between selected pixel node $P_0$ and white curve node $P_1$, wherein $Dis1=DIST(P_0, P_1)$, as follows:

(1) Performing an initial determination:

$dX=|XP_0-XP_1|$; $dY=|YP_0-YP_1|$, $D=dX+dY$;

(2) Calculating the Min and Max:

```
IF (dX > dY) then
    Min = dY;
    Max1 = dX;
    Max2 = dX / 2;
    Max4 = dX / 4;
    Max8 = dX / 8;
ELSE
    Min = dX;
    Max1 = dY;
    Max2 = dY / 2;
    Max4 = dY / 4;
    Max8 = dY / 8; and
```

(3) Setting the distance based on these relationships:

```
IF (Min <= Max8)
    DIST = D;
IF (Max8 < Min <= Max4)
    DIST = D/2 + D/4 + D/8;
IF (Min > Max4)
    DIST = D/2 + D/4;
```

The DIST(A, B) procedure discussed above is repeated to calculate the distance between selected pixel node $P_0$, and each white curve node $P_1$, $P_2$, $P_3$, $P_4$. Accordingly, DIST(A, B) procedure continues, where $Dis2=DIST(P_0, P_2)$; $Dis3=DIST(P_0, P_3)$; and $Dis4=DIST(P_0, P_4)$.

At step 208, the two nodes on the white curve closest to the selected pixel node $P_0$ defines an interval on the white curve, which is selected for further evaluation. In the example shown in FIG. 5a, the two nodes on the white curve closest to the selected pixel node $P_0$ in FIG. 5a are $P_1$ and $P_2$, so the white curve interval $L_{12}$ between $P_1$ and $P_2$ is selected for further evaluation.

FIG. 5b shows a blow-up of the two nodes $P_1$ and $P_2$ with associated coordinates $(X_1,Y_1)$ and $(X_2,Y_2)$. At step 210, the interval $L_{12}$ between the two nodes $P_1$ and $P_2$ is divided into four equal intervals. FIG. 5b illustrates the interval between the two nodes $P_1$ and $P_2$ having a set of sub-nodes $P_1$, $P_5$, $P_6$, $P_7$, $P_2$ with associated coordinates $(X_1,Y_1)$, $(X_5,Y_5)$, $(X_6,Y_6)$, $(X_7,Y_7)$, $(X_2,Y_2)$. The coordinates for sub-nodes $P_5$, $P_6$, and $P_7$, can be defined as follows:

$X_5=X_1+\text{delta}X/4$;

$X_6=X_1+\text{delta}X/2$;

$X_7=X_1+\text{delta}X/2+\text{delta}X/4$;

$Y_5=Y_2+\text{delta}Y/2+\text{delta}Y/4$;

$Y_6=Y_2+\text{delta}Y/2$; and $Y_7=Y_2+\text{delta}Y/4$, where $\text{delta}X=X_2-X_1$ and $\text{delta}Y=Y_1-Y_2$. FIG. 5b depicts the interval $L_{12}$ between the two nodes $P_1$ and $P_2$ divided into four equal intervals $L_{15}$, $L_{56}$, $L_{67}$, $L_{72}$. Interval $L_{15}$ is between nodes $P_1$ and $P_5$. Interval $L_{56}$ is between nodes $P_5$ and $P_6$. Interval $L_{67}$ is between nodes $P_6$ and $P_7$. Interval $L_{72}$ is between nodes $P_7$ and $P_2$.

Next at step 212, the distance between the selected pixel node $P_0$ and each sub-node $P_1$, $P_5$, $P_6$, $P_7$, and $P_2$ is calculated. FIG. 5b depicts the distances $d_1$, $d_5$, $d_6$, $d_7$ and $d_2$ calculated between the selected pixel node $P_0$ and each sub-node $P_1$, $P_5$, $P_6$, $P_7$, $P_2$. The distances $d_1$, $d_5$, $d_6$, $d_7$ and $d_2$ are computed as follows:

$$d_1 = DIST(P_0, P_1);$$

$$d_5 = DIST(P_0, P_5);$$

$$d_6 = DIST(P_0, P_6);$$

$$d_7 = DIST(P_0, P_7); \text{ and}$$

$$d_2 = DIST(P_0, P_2),$$

where the procedure DIST(A,B) calculates the distances $d_1$, $d_5$, $d_6$, $d_7$ and $d_2$, applying the same estimation, as discussed above.

It should be appreciated to one skilled in the art, that steps 208 through 212 can be repeatedly performed to further narrow the intervals on the white curve and define the sub-node closest to the pixel; thereby determining the shortest distance possible from the pixel to the white curve.

At step 214, the shortest distance among the distances $d_1$, $d_5$, $d_6$, $d_7$ and $d_2$ is selected for the next evaluation. At step 216, the threshold distance TH, shown in FIGS. 5a and 5b, which was determined during manufacturing is obtained from a storage area. At step 218, the selected shortest distance is compared with the threshold distance TH. If the selected shortest distance is less than the threshold distance TH, then the pixel is determined to be within the white area of the image and values are saved (120) and used (step 136) for the white balance statistics, which are in turn used to perform a white balance operation (step 140). Otherwise, the pixel is determined to be outside the white area of the image and the pixel data is discarded.

The selecting process described above is independent of the type of coordinates used to define the white curve. Furthermore, the selecting process does not require a large amount of resources for implementation due to the estimations used.

Figure 6:
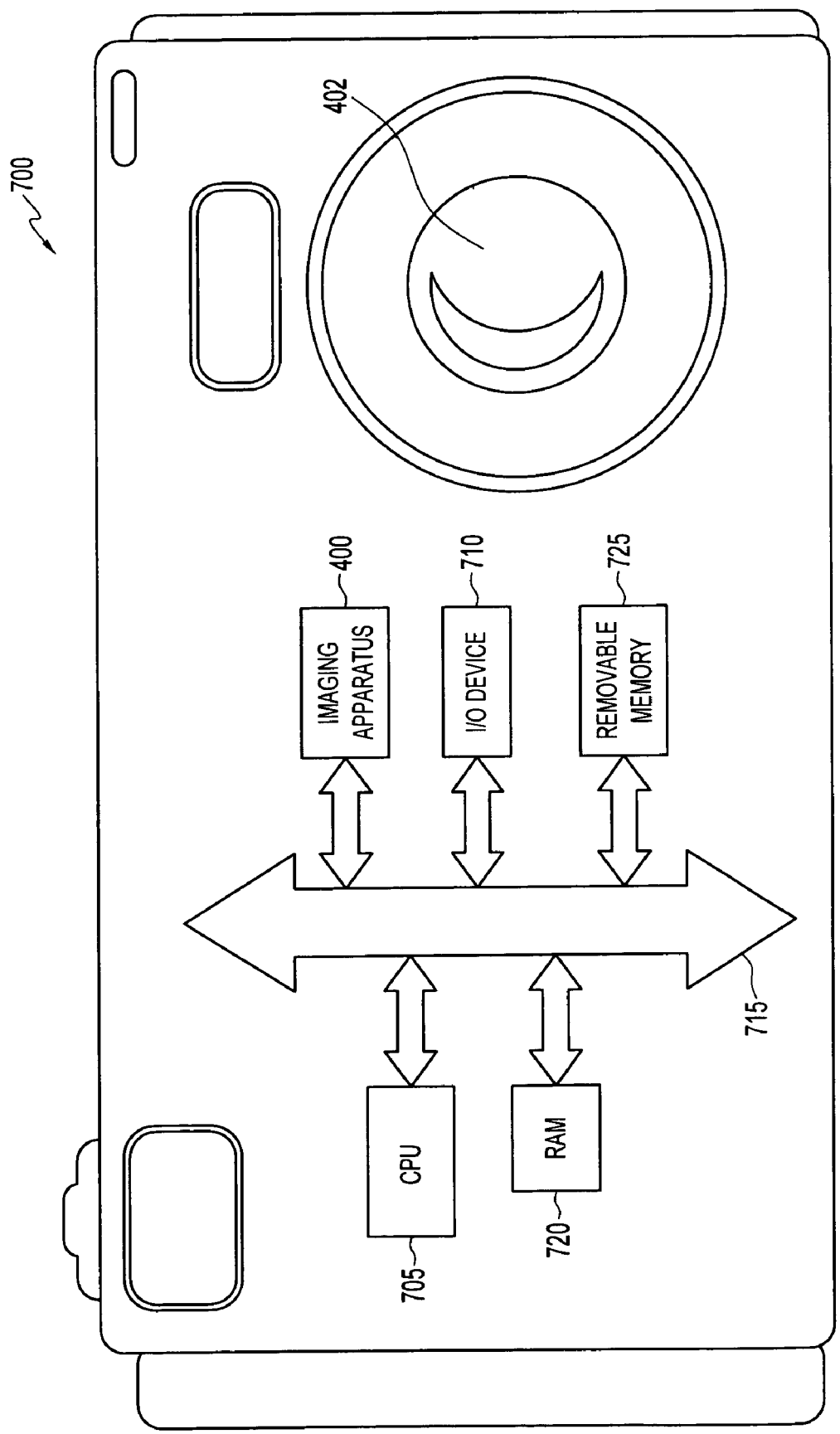
FIG. 6 is a block diagram of a system that includes an imaging apparatus, such as the apparatus shown in FIG. 2.

FIG. 6 shows an embodiment of a processor system 700, e.g., a camera system, which includes an imaging apparatus 400 (as constructed in FIG. 2) using the white balance statistics and balancing. Without being limiting, system 700 could include, instead of a camera, a computer system, scanner, machine vision system, vehicle navigation system, video telephone, surveillance system, auto focus system, star tracker system, motion detection system, image stabilization system, and other image acquisition or processing system.

System 700, for example, a camera system includes a lens 402 for focusing an image on a pixel array of the image sensor 404, central processing unit (CPU) 705, such as a microprocessor, which controls camera operation, and which communicates with one or more input/output (I/O) devices 710 over a bus 715. Imaging apparatus 400 also communicates with the CPU 705 over bus 715. The processor system 700 also includes random access memory (RAM) 720, and can include removable memory 725, such as flash memory, which also communicate with CPU 705 over the bus 715. Imaging apparatus 400 may be combined with the CPU, with or without memory storage on a single integrated circuit or on a different chip than the CPU.

The above description and drawings illustrate embodiments of the invention. Although certain advantages and embodiments have been described above, those skilled in the art will recognize that substitutions, additions, deletions, modifications and/or other changes may be made. Accordingly, the embodiments are not limited by the foregoing description but are only limited by the appended claims.

What is claimed as new and desired to be protected by Letters Patent of the United States is:

1. An imaging device, comprising:
   a pixel array for capturing an image; and
   an image processing circuit for performing a white balancing operation; the image processing circuit comprising:
      a first circuit portion for:
         calculating first respective distances between a node from a selected pixel from the captured image and each node on a white curve defining a predetermined white area of the image sensor, where the nodes are plotted in a two-dimension space;
         selecting two of the white curve nodes closest to the selected pixel node;
         dividing an interval between the two closest white curve nodes into multiple intervals having a set of sub-nodes;
         calculating second respective distances between the selected pixel node and each sub-node;
         selecting a distance determined to be shortest distance among the second respective distances; and
         saving pixel data for a selected pixel if said selected distance is less than a predetermined value; and
      a second circuit portion for performing an automatic white balance operation using the saved pixel data.

2. The imaging device of claim 1, wherein the first circuit portion of the image processing circuit defines coordinates of the white curve nodes in an x and y coordinate color space.

3. The imaging device of claim 1, wherein the first circuit portion of the image processing circuit defines a coordinate of the pixel node in an x and y coordinate color space.

4. An imaging system, comprising:
   a processor; and
   an imaging device coupled to the processor, the imaging device comprising:
      an image sensor for receiving an image and outputting an image signal that includes pixel data for each pixel of the image; and
      an image processor in communication with the image sensor for performing a white balancing operation on the image, the image processor comprising:
      means for defining a white curve as a piece-wise linear curve in a two-dimension space, wherein the white curve is located in the white area, and the piece-wise linear curve is defined by a set of white curve nodes;
      means for defining the pixel by a pixel node in the two-dimension space;
      means for calculating first respective distances between the selected pixel node and each white curve node;
      means for selecting two white curve nodes determined to be closest to the selected pixel node;
      means for defining an interval between the selected two white curve nodes by multiple sub-nodes;
      means for calculating second respective distances between the selected pixel node and each sub-node;
      means for selecting a shortest distance among the second respective distances;
      means for determining if the shortest distance is less than a predefined threshold distance;
      means for saving only pixels having a shortest distance which is less than the predefined distance to obtain automatic white balance statistics; and means for performing white balance on the image by applying the obtained automatic white balance statistics.

5. A camera, comprising:

a lens;

an image sensor for receiving an image from the lens and outputting an image signal that includes pixel data for each pixel of the image;

a memory for storing a white curve associated with said image sensor, the white curves being defined by multiple node coordinates in a coordinate color space; and an image processor for processing the image signal, the image processor being operable on each of at least some pixels of the image, to:

select the pixel from the image, the pixel having a pixel node in the color space;

obtain coordinates for the stored white curve;

calculate first respective distances from the selected pixel node to each white curve node;

select two of the white curve nodes determined to be closest to the selected pixel node;

divide an interval between the two white curve nodes into four equal sub-intervals, the sub-intervals being defined in the color space by sub-nodes;

define the sub-intervals by a set of sub-nodes;

calculate second respective distances from the selected pixel node to each sub-node; and save a pixel which has a shortest distance among the second respective distances, which is less than a threshold defining a boundary of a white area in the color space.

6. The camera of claim 5, wherein the image processor is further operable to use saved selected pixels to obtain automatic white balance statistics and to use the statistics in an in an automatic white balance statistic, and to use the statistics in the image.

7. The camera of claim 6, wherein the color space corresponds to YUV domain.

8. The camera of claim 7, wherein the coordinates for the color space corresponds to UV components.

* * * * *